(12) United States Patent
Funato et al.

(10) Patent No.: US 12,722,851 B2
(45) Date of Patent: Sep. 1, 2026

(54) CONTAINER WITH LABEL

(71) Applicant: YUPO CORPORATION, Tokyo (JP)

(72) Inventors: Takashi Funato, Tokyo (JP); Yuta Iwasawa, Tokyo (JP); Takuya Ikarashi, Ibaraki (JP)

(73) Assignee: YUPO CORPORATION, Tokyo (JP)

(*) Notice: Subject to any disclaimer, the term of this patent is extended or adjusted under 35 U.S.C. 154(b) by 263 days.

(21) Appl. No.: 18/279,503

(22) PCT Filed: Mar. 9, 2022

(86) PCT No.: PCT/JP2022/010376
§ 371 (c)(1),
(2) Date: Aug. 30, 2023

(87) PCT Pub. No.: WO2022/191248
PCT Pub. Date: Sep. 15, 2022

(65) Prior Publication Data

US 2024/0150075 A1 May 9, 2024

(30) Foreign Application Priority Data

Mar. 10, 2021 (JP) ................................ 2021-038366

(51) Int. Cl.
*B65D 23/08* (2006.01)
*C09J 7/26* (2018.01)
(Continued)

(52) U.S. Cl.
CPC ............ *B65D 23/0864* (2013.01); *C09J 7/26* (2018.01); *C09J 7/35* (2018.01); *C09J 123/02* (2013.01); *C09J 2203/334* (2013.01)

(58) Field of Classification Search
CPC . B65D 23/0864; C09J 7/26; C09J 7/35; C09J 123/02; C09J 2203/334; G09F 2003/0272
See application file for complete search history.

(56) References Cited

U.S. PATENT DOCUMENTS 6,838,138 B1 1/2005 Akiyama et al.
2005/0276943 A1* 12/2005 Iwasa .................. B65D 1/0207 428/35.7
(Continued)

FOREIGN PATENT DOCUMENTS

JP 7-100906 4/1995
JP H07100906 A * 4/1995
(Continued)

OTHER PUBLICATIONS

Machine Translation of JP H07-100906 A. (Year: 1995).*
(Continued)

*Primary Examiner* — Brian Handville
(74) *Attorney, Agent, or Firm* — GREENBLUM & BERNSTEIN, P.L.C.

(57) ABSTRACT

Provided is a labeled container that is easily peeled off when being scrapped, while having sufficient adhesion. The labeled container comprises a label having a heat sealing layer, and a resin container to which the label is attached through the heat sealing layer. A part of the label is embedded in the resin container, and a notch portion is provided around the label on the surface of the resin container. The notch portion has a depth (d) of 40 μm or more. The notch portion has a width (L) of 300 μm or more. One selected from the resin container and the heat sealing layer on the attached surfaces contains a polyolefin resin as a main component, and the other contains a polyester resin as a main component.

9 Claims, 3 Drawing Sheets

(51) Int. Cl.
*C09J 7/35* (2018.01)
*C09J 123/02* (2006.01)

(56) References Cited

U.S. PATENT DOCUMENTS

2015/0266606 A1* 9/2015 Wiegers .................... B65C 9/26 156/538
2016/0251116 A1* 9/2016 Funato ................ B29C 49/0411 206/459.5
2021/0394495 A1 12/2021 Honda et al.

FOREIGN PATENT DOCUMENTS

JP 2006-168355 6/2006
JP 2008-133006 6/2008
JP 2008133006 A * 6/2008
JP 2009-40038 2/2009
JP 2020-19510 2/2020
JP 2020019510 A * 2/2020
WO 03/086883 10/2003
WO 2020/067327 4/2020

OTHER PUBLICATIONS

Machine Translation of JP 2008-133006 A. (Year: 2008).*
Machine Translation of JP 2020-019510 A. (Year: 2020).*
Istvan Benedek and Mikhail M. Feldstein, "Chapter 3—Block Copolymer-Based Hot-Melt Pressure-Sensitive Adhesives" from Technology of Pressure-Sensitive Adhesives and Products, 2009, Taylor & Francis Group, LLC, pp. 3-1 to 3-45 (Year: 2009).*
Supplementary European Search Report issued in EP Application No. 22 76 7202, dated Nov. 28, 2024.
International Search Report Issue in International Patent Application No. PCT/JP2022/010376, dated Apr. 26, 2022.

* cited by examiner

CONTAINER WITH LABEL

TECHNICAL FIELD

The present invention relates to a labeled container.

BACKGROUND ART

As a label of a resin container molded using a mold, an in-mold label to be attached to the surface of the resin container by heat during molding is used. In order to increase the adhesion to the resin container, it is generally necessary to design the heat sealing layer of the in-mold label according to the physical properties of the material of the container. For example, in the case of a polyethylene terephthalate (PET) resin container, in order to increase the affinity to the PET resin, the heat sealing layer is blended with a compound having a polar group. Further, in order to increase the polarity of the surface of the heat sealing layer, plasma treatment under nitrogen is applied to the surface (see Patent Literatures 1 and 2).

On the other hand, plastics are actively recycled, from the viewpoint of environmental protection. For example, a shrink label is detached from a resin container with the label after use, and the resin container is recycled. In contrast, an in-mold label integrally provided on a resin container is generally peeled off by immersing the resin container with the label in a hot alkaline solution for several tens of minutes (see, for example, Patent Literature 3).

CITATION LIST

Patent Literature

Patent Literature 1: International Publication No. WO 2020/067327

Patent Literature 2: Japanese Patent Laid-Open No. 2009-40038

Patent Literature 3: Japanese Patent Laid-Open No. 2006-168355

SUMMARY OF INVENTION

Technical Problem

Shrink labels can generally be detached by hand. However, it was difficult to peel off in-mold labels by hand. For this reason, there has been a demand for an easier label peeling method.

An object of the present invention is to provide a labeled container that is easily peeled off when being scrapped, while having sufficient adhesion.

Solution to Problem

As a result of extensive research to achieve the above object, the present inventors have found that the object can be achieved by using a specific combination of resin materials for the attached surfaces of a label and a resin container, and designing a notch portion formed around the label on the surface of the resin container to a specific size. Thus, the present invention has been completed.

Specifically, the present invention is as shown below.

(1) A labeled container, comprising a label having a heat sealing layer, and a resin container to which the label is attached through the heat sealing layer, wherein a part of the label is embedded in the resin container, a notch portion is provided around the label, the notch portion has a depth (d) of 40 μm or more, the notch portion has a width (L) of 300 μm or more, and one selected from the resin container and the heat sealing layer on the attached surfaces contains a polyolefin resin as a main component, and the other contains a polyester resin as a main component.

(2) The labeled container according to (1) above, wherein the notch portion has a depth (d) of 100 μm or less.

(3) The labeled container according to (1) or (2) above, wherein the notch portion has a width (L) of 900 μm or less.

(4) The labeled container according to any one of (1) to (3) above, wherein the heat sealing layer contains a polyolefin resin as a main component, and the resin container contains a polyester resin as a main component.

(5) The labeled container according to any one of (1) to (4) above, wherein the label comprises a substrate layer on a surface of the heat sealing layer on a side opposite to the resin container, and the substrate layer is a porous resin film comprising a thermoplastic resin and a filler.

Advantageous Effect of Invention

According to the present invention, it is possible to provide a labeled container that is easily peeled off when being scrapped, while having sufficient adhesion.

DESCRIPTION OF EMBODIMENTS

Figure 1:
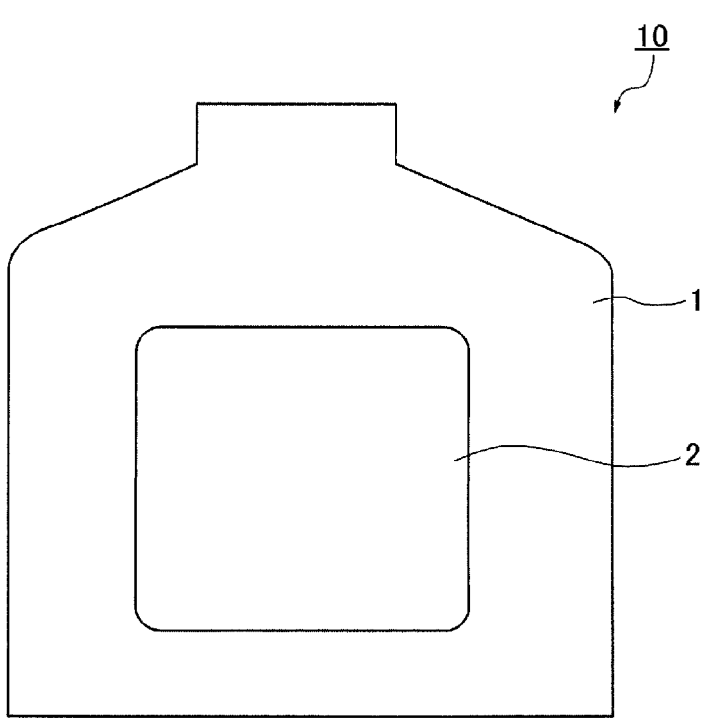
FIG. 1 is a plan view showing an example of the labeled container.

The labeled container of the present invention will be described in detail below. The following description is an example (typical example) of the present invention, and the present invention is not limited thereto.

In the following description, the term "(meth)acrylic" refers to both acrylic and methacrylic.

[Labeled Container]

The labeled container of the present invention comprises a label having a heat sealing layer, and a resin container. The label is attached to the resin container through the heat sealing layer. A part of the label is embedded in the resin container, and a notch portion is provided around the label of the labeled container. The notch portion is formed from the end of the embedded label and the resin container surrounding the label end. Such a labeled container can be obtained in such a manner that the heat sealing layer is attached to the resin container by heat during molding of the resin container, and the molten container resin follows the shape of the label.

<Notch Portion of Resin Container>

In the present invention, the depth (d) of the notch portion, that is, the length (d) from the surface of the resin container without the label to the deepest part of the notch portion, is 40 μm or more.

The width (L) of the notch portion, that is, the length from the end of the label to the outer edge of the notch portion, is 300 μm or more.

The notch portion of such a size makes it possible to insert a nail or a plate-like tool around the label, thus creating a trigger for peeling off the label. For example, by inserting a nail into the notch portion and pushing it toward the label, the attached surfaces between the label and the resin container can be easily separated by hand. Therefore, after peeling off the label, the resin container can be easily recycled without going through complicated processes, such as immersion in an alkaline solution.

From the viewpoint of the ease of creating a trigger for peeling off the label, the depth (d) of the notch portion is preferably 50 μm or more, and more preferably 60 μm or more. From a similar point of view, the width (L) of the notch portion is preferably 400 μm or more, and more preferably 500 μm or more.

From the viewpoint of avoiding practical problems, such as removal of the label before being scrapped due to the notch portion, the depth (d) of the notch portion is preferably 100 μm or less, and more preferably 90 μm or less. From a similar point of view, the width (L) of the notch portion is preferably 900 μm or less, and more preferably 800 μm or less.

On the other hand, in the labeled container, a part of the label (a part of the label in the thickness direction) is embedded in the resin container. As a result, the label is fixed to the resin container while leaving the notch portion that triggers peeling off the label, making it easier to obtain practical adhesiveness when using the labeled container. From the viewpoint of adhesiveness, the embedding rate of the label in the resin container calculated by the following formula (F1) is preferably 3% or more, more preferably 5% or more, even more preferably 10% or more, and particularly preferably 20% or more. Further, from the viewpoint of the ease of peeling, the embedding rate is preferably 50% or less, and more preferably 30% or less.

$$\text{Embedding rate }(\%)=(t-d)\times 100/t \qquad \text{(F1)}$$

[in the formula (F1), t represents the thickness of the label (when the label protrudes from the surface of the resin container, the protruding part is excluded), and d represents the depth of the notch portion.]

The size of the notch portion can be adjusted by the heating and pressurization conditions during molding of the resin container.

<Resin Materials of Resin Container and Label>

In the present invention, one selected from the resin container and the heat sealing layer on the attached surfaces contains a polyolefin resin as a main component, and the other contains a polyester resin as a main component. The main component refers to a resin component with the highest content among various resins.

In general, the same type of resin as the main component resin of the resin container is selected for the heat sealing layer of the label. This is because resins of the same type have high affinity and increase adhesiveness. For example, when the main component of the resin container is a polyethylene resin, a polyolefin resin such as the same polyethylene resin is selected as the main component of the heat sealing layer. Conversely, when the main component of the resin container is a polyester resin such as a PET resin, a resin having a polar group like the PET resin can be selected as the main component of the heat sealing layer.

However, in the present invention, when a polyolefin resin such as a polyethylene resin is used as the main component of the resin container, a polyester resin is selected as the main component of the heat sealing layer. Conversely, when a polyester resin is used in the resin container, a polyolefin resin is selected as the main component of the heat sealing layer. A combination of different types of resin materials has lower adhesiveness than a combination of the same type of resin materials. Therefore, it is easy to peel off the label from the notch portion around the label even by hand. Thus, by adjusting the adhesiveness to a low level by material design, covering the label end with at least part of the resin container, and making the notch portion an appropriate size, a labeled container that causes no practical problems when used and that is easy to peel off the label by hand when scrapped can be obtained.

Specific examples will be described with reference to FIGS. 1 to 3.

FIG. 1 shows the appearance of a labeled container 10, which is an example of the present invention.

The labeled container 10 comprises a hollow resin container 1, and a label 2 attached to the surface thereof.

Figure 2:
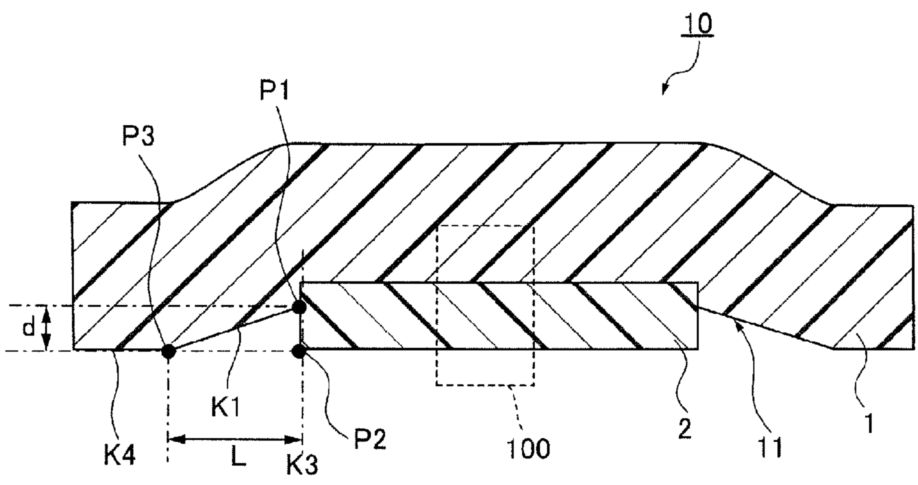
FIG. 2 is a cross-sectional view of the labeled container.

FIG. 2 is a cross-sectional view of the labeled container 10.

The label 2 is embedded in the resin container 1, and the resin container 1 is recessed inside due to the embedding of the label. A notch portion 11 is formed in the labeled container 10 by the inner wall of the resin container 1 inclined by the recess and the outer wall of the end of the label 2. That is, there are gaps around the label 2 of the resin container 1.

As described above, the depth d of the notch portion 11 is 40 μm or more. The width L of the notch portion 11 is 300 μm or more. The depth d is measured as the distance between points P1 and P2, and the width L is measured as the distance between points P2 and P3. The point P1 is the intersection between an inclined surface K1 of the resin container 1, which forms the notch portion 11, and the end surface of the label 2. The point P2 is the intersection between a line K3 extending in the thickness direction of the label 2 through the intersection P1 and a line K4 extending along the surface of the resin container 1 to which the label 2 is not attached. The point P3 is the intersection between the line K4 and the inclined surface K1 of the resin container 1.

Figure 3:
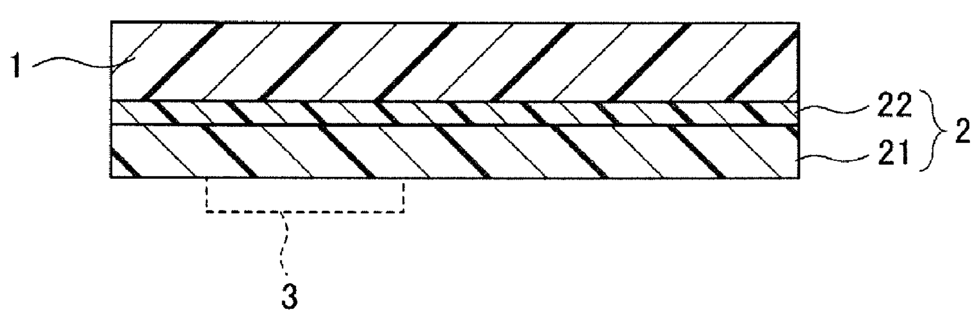
FIG. 3 is an enlarged view within the dotted line frame in FIG. 2.

FIG. 3 is an enlarged view within the dotted line frame 100 in FIG. 2.

The label 2 comprises a substrate layer 21 and a heat sealing layer 22. The heat sealing layer 22 is attached to the surface of the resin container 1 by heating. A printed layer 3 can be provided on the surface of the substrate layer 21 on the side opposite to the heat sealing layer 22.

The configuration of the labeled container will be described below.

(Resin Container)

As the resin material of the resin container in the present invention, a polyester resin or a polyolefin resin can be used as described above. The resin container may have a single-layer structure or a multilayer structure. In the case of a multilayer structure, the outermost layer to be attached to the label contains a polyester resin or a polyolefin resin as a main component.

Examples of polyester resins include polyethylene terephthalate (PET), polybutylene terephthalate, polybutylene succinate, polylactic acid, and the like.

Examples of polyolefin resins include polypropylene-based resins, polyethylene-based resins, and the like.

The color of the container may be transparent or a natural color that does not contain coloring materials, such as pigments or dyes, or may be an opaque color due to coloring materials or coloring.

The cross-sectional shape of the body of the container may be circular, elliptical, or rectangular. When the cross-sectional shape of the container body is rectangular, it is preferable that the corners have curvature. From the viewpoint of strength, the cross section of the container body is preferably a perfect circle or an elliptical shape close to a perfect circle, and more preferably a perfect circle.

(Label)

The label of the present invention can be used as an in-mold label. The label is generally a laminate comprising a substrate layer and a heat sealing layer, but may further comprise other layers, if necessary. For example, like the printed layer 3 shown in FIG. 3, the label may comprise a printed layer on the surface of the substrate layer on the side opposite to the heat sealing layer. The printed layer is made of an ink composition transferred by printing.

In addition to such a printed layer, for example, pattern layers such as transfer foil, holograms, and security threads, which are provided for the purpose of design, anti-counterfeiting, and the like; intermediate layers for adjusting thickness, strength, and the like; and functional layers such as polarizing films, may be provided.

<Substrate Layer>

The substrate layer is not particularly limited as long as it can impart strength to the label, and may be, for example, a thermoplastic resin film.

From the viewpoint of making a white label, the substrate layer may be a porous resin film containing a thermoplastic resin and a filler.

When a porous resin film is used, the label is pressurized and pressed against the inner wall of the mold during in-mold molding. At this time, the pores in the porous resin film are also crushed, and the thickness of the substrate layer may be reduced. However, when the label is removed from the mold and released from pressure, the pores in the porous resin film return to their original state, and the thickness of the substrate layer also returns to its original state. The surfaces of the label and the resin container are in the same position within the mold due to the pressurization; however, due to the increase in the thickness of the substrate layer, the surface of the label protrudes from the surface of the resin container. As a result, the notch portion of the resin container around the label is more likely to be caught by a nail or the like, making it easier to create a trigger for peeling. In addition, since the porous resin film tends to have strong cushioning properties, when released from the blow pressure of in-mold molding, the label repels and becomes less embedded in the resin container, and a deep notch portion is easily formed.

From the viewpoint of making it easier to create a trigger for peeling, the substrate layer may be a stretched film containing a thermoplastic resin. When the substrate layer is a stretched film, the elastic modulus tends to be higher; thus, when released from the blow pressure of in-mold molding, the label repels and becomes less embedded in the resin container, and a deep notch portion is easily formed.

Thermoplastic resins that can be used in the substrate layer include polyolefin resins, polyester resins, polyvinyl chloride resins, polyamide resins, polystyrene resins, polycarbonate resins, and the like. These can be used singly or in combination of two or more. From the viewpoint of mechanical strength, the substrate layer preferably contains a polyolefin resin or a polyester resin as a main component, and more preferably contains a polyolefin resin as a main component.

Polyolefin resins that can be used in the substrate layer include polypropylene resins, polyethylene resins, and the like. Of these, polypropylene resins are preferred, from the viewpoint of moldability and mechanical strength.

Examples of polypropylene resins include propylene homopolymers prepared by homopolymerizing propylene, such as isotactic homopolypropylene and syndiotactic homopolypropylene; propylene copolymers composed mainly of propylene and copolymerized with α-olefins, such as ethylene, 1-butene, 1-hexene, 1-heptene, 1-octene, and 4-methyl-1-pentene, and the like. Propylene copolymers may be binary copolymers or ternary or higher copolymers, and may be random copolymers or block copolymers.

Examples of polyethylene resins include high-density polyethylene having a density of 0.940 to 0.965 $g/cm^3$; medium-density polyethylene having a density of 0.920 to 0.935 $g/cm^3$; linear low-density polyethylene having a density of 0.900 to 0.920 $g/cm^3$; copolymers composed mainly of ethylene or the like and copolymerized with α-olefins, such as propylene, butene, hexene, heptene, octene, and 4-methylpentene-1; ethylene-cyclic olefin copolymers, and the like.

These polyolefin resins can be used singly or in combination of two or more.

Polyester resins that can be used in the substrate layer include polyethylene terephthalate resins, polybutylene terephthalate resins, polyethylene naphthalate, and the like. Polyamide resins that can be used in the substrate layer include nylon-6, nylon-6,6, nylon-6,10, nylon-6,12, and the like.

(Filler)

Fillers that can be used in the substrate layer include inorganic fillers or organic fillers. The inclusion of a filler facilitates the formation of a porous resin film with pores inside the film. Further, the whiteness or opacity of the substrate layer can be increased.

Examples of inorganic fillers include inorganic particles, such as heavy calcium carbonate, light calcium carbonate, calcined clay, silica, diatomaceous earth, white clay, talc, titanium oxide such as rutile-type titanium dioxide, barium sulfate, aluminum sulfate, zinc oxide, magnesium oxide, mica, sericite, bentonite, sepiolite, vermiculite, dolomite, wollastonite, and glass fibers. Of these, heavy calcium carbonate, clay, or diatomaceous earth is preferred because of good pore moldability and low cost. For the purpose of improving dispersibility and the like, the surface of the inorganic filler may be treated with a surface treatment agent, such as fatty acid.

When the thermoplastic resin constituting the substrate layer contains a polyolefin resin as a main component, examples of organic fillers include organic particles incompatible with polyolefin resins, such as polyethylene terephthalate, polyethylene naphthalate, polybutylene terephthalate, polyamide, polycarbonate, polystyrene, cyclic olefin homopolymer, ethylene-cyclic olefin copolymer, polyethylene sulfide, polyimide, polymethacrylate, polyethyl ether ketone, polyphenylene sulfide, and melamine resin.

The substrate layer may contain one of the above inorganic fillers or organic fillers, or a combination of two or more of them.

From the viewpoint of increasing the whiteness or opacity of the substrate layer, the content of the filler in the substrate layer is preferably 10 mass % or more, and more preferably 15 mass % or more. Further, from the viewpoint of improving the molding uniformity of the substrate layer, the content of the filler in the substrate layer is preferably 70 mass % or less, more preferably 60 mass % or less, and even more preferably 50 mass % or less.

From the viewpoint of the ease of pore formation, the average particle size of the filler is preferably 0.01 μm or more, more preferably 0.05 μm or more, and even more preferably 0.1 μm or more. From the viewpoint of imparting mechanical strength, such as tear resistance, the average particle size of the filler is preferably 15 μm or less, more preferably 5 μm or less, and even more preferably 2 μm or less.

The average particle size of the inorganic filler is the volume average particle size (cumulative 50% particle size), which corresponds to 50% of the cumulative volume measured by a particle measuring device, for example, a laser diffraction type particle size distribution measuring device (Microtrac, produced by Nikkiso Co., Ltd.). The average particle size of the organic filler is the average dispersed particle size when dispersed in a thermoplastic resin by melt-kneading and dispersion. The average dispersed particle size can be determined by observing the cut surface of a thermoplastic resin film containing an organic filler under an electronic microscope, measuring the maximum diameter of at least 10 particles, and determining the average dispersed particle size as the average thereof.

Depending on the intended purpose, the substrate layer may contain additives, such as sterically hindered phenol-based, phosphorus-based, amine-based, and sulfur-based antioxidants; sterically hindered amine-based, benzotriazole-based, and benzophenone-based light stabilizers; dispersants; lubricants; and antistatic agents.

From the viewpoint of suppressing the deterioration of printability while obtaining sufficient effects of additives, the content of additives in the substrate layer can be generally set to 0.001 to 3 mass % independently for each type of additive.

<Thickness>

From the viewpoint of suppressing the formation of wrinkles during printing and facilitating fixation at the desired position during insertion into the mold, and from the viewpoint of giving a trigger for peeling off the label after being scrapped, the thickness of the substrate layer is preferably 40 μm or more, and more preferably 50 μm or more. Further, from the viewpoint of reducing the amount of resin used in the label, the thickness of the substrate layer is preferably 150 μm or less, and more preferably 120 μm or less. Therefore, the thickness of the substrate layer is preferably 40 to 150 μm, and more preferably 50 to 120 μm.

The substrate layer may have a single-layer structure or a multilayer structure. In the case of a multilayer structure, each layer can impart various functions, such as white opacity, adhesion to the ink used in the printed layer, heat insulation, and easy pee lability.

Suitable transparent substrate layers include filler-free polypropylene-based unstretched films (CPP films), polypropylene-based biaxially stretched films (BOPP films), polyethylene terephthalate-based unstretched films (CPET films), polyethylene terephthalate-based biaxially stretched films (BOPET films), and the like.

Further, suitable opaque substrate layers include filler-containing CPP films, BOPP films, CPET films, BOPET films, and the like.

The surface of the substrate layer may be activated by activation treatment, from the viewpoint of increasing the adhesion to the printed layer. Examples of the activation treatment include corona discharge treatment, flame treatment, plasma treatment, glow discharge treatment, ozone treatment, and the like. Of these, corona discharge treatment or flame treatment is preferred, and corona treatment is more preferred.

From a similar point of view, a printable layer may be provided between the substrate layer and the printed layer. The printable layer preferably contains at least one of a binder and an antistatic agent, in order to increase the adhesion to the printed layer. The printable layer may also contain, if necessary, additives, such as antiblocking agents, colorants, defoamers, and antifungal agents.

<Heat Sealing Layer>

The heat sealing layer increases the adhesiveness of the label with the resin container. During in-mold molding of the resin container, the label is provided inside the mold so that the resin container and the heat sealing layer face each other. The heat sealing layer is melted by heat during in-mold molding, and the label is attached to the surface of the resin container.

As described above, the heat sealing layer contains a polyolefin resin or a polyester resin as a main component in accordance with the resin used as a main component of the surface of the resin container. The phrase "contains . . . as a main component" means that the heat sealing layer contains the resin in an amount of, for example, 50 mass % or more, preferably 70 mass % or more, and more preferably 90 mass % or more. The polyolefin resin is a resin containing an olefin alone as a polymer component.

The heat sealing layer that contains a polyolefin resin as a main component may contain a resin having an olefin and a monomer having a polar group other than olefins as polymer components within the range that does not impair the effects of the present invention. Because the heat sealing layer contains such a resin, the adhesiveness between the label and the polyester resin container can be improved, and the balance with the ease of peeling the label from the resin container made of a polyester resin can be balanced with higher accuracy. The resin having an olefin and a monomer having a polar group other than olefins as polymer components refers to a resin containing an olefin as a polymer component in an amount of 50 mass % or more, preferably 70 mass % or more, and more preferably 90 mass % or more.

Examples of polyolefin resins that can be used in the heat sealing layer include ethylene-based resins, propylene-based resins, ethylene-propylene copolymers, ethylene-α-olefin copolymers, and the like. Examples of ethylene-based resins include polyethylene-based resins having a melting point of 60 to 130° C., such as low-density or medium-density polyethylene having a density of 0.900 to 0.935 g/cm$^3$; linear low-density polyethylene having a density of 0.880 to 0.940 g/cm$^3$; and metallocene-based polyethylene produced by using a metallocene catalyst. Of these, an ethylene-based resin is more preferred, and low-density or medium-density polyethylene having a crystallinity measured by the X-ray method of 10 to 60% and a number average molecular weight of 10,000 to 40,000, or linear low-density polyethylene is preferred.

Polyester resins include resins similar to the polyester resins mentioned as the main component of the resin container.

From the viewpoint of increasing adhesiveness by sufficiently melting the resin by heating during in-mold molding, the melting point of the resin used in the heat sealing layer is preferably 130° C. or less, more preferably 110° C. or less, and even more preferably 100° C. or less.

Since the higher the melting point, the easier it is to form a film, and it is easier to reduce, for example, sticking to rolls during film production, the melting point of the resin is more preferably 45° C. or more, and even more preferably 50° C. or more.

The above melting point can be measured by differential scanning calorimetry (DSC).

The heat sealing layer may also contain, if necessary, additives commonly used in the field of polymers, such as antifogging agents, lubricants, antiblocking agents, antistatic agents, antioxidants, heat stabilizers, light stabilizers, weather stabilizers, and UV absorbers.

The content of these additives in the heat sealing layer is generally 0.01 to 5 mass % independently for each type of additive.

The heat sealing layer may have a single-layer structure or a multilayer structure. In the case of a multilayer structure, at least the main component of the outermost surface of the heat sealing layer to be attached to the resin container is selected to be in the specific combination described above with the main component of the surface of the resin container.

<Thickness>

From the viewpoint of increasing adhesiveness, the thickness of the heat sealing layer is preferably 0.5 μm or more, more preferably 0.7 μm or more, and even more preferably 1 μm or more. Further, from the viewpoint of suppressing cohesive failure within the heat sealing layer, the thickness of the heat sealing layer is preferably 10 μm or less, more preferably 3 μm or less, and even more preferably 2 μm or less. Therefore, the thickness of the heat sealing layer is preferably 0.5 to 10 μm, more preferably 0.7 to 3 μm, and even more preferably 1 to 2 μm.

<Method for Producing Label>

The method for producing the label is not particularly limited; however, the label can be produced by laminating films of the substrate layer and heat sealing layer.

«Film Formation and Lamination»

Examples of the method for forming the film of each layer include cast molding, in which a molten resin is extruded into a sheet shape using a single-layer or multilayer T-die, I-die, or the like connected to a screw-type extruder; calender molding; roll molding; inflation molding; and the like. The film may be formed by subjecting a mixture of a thermoplastic resin and an organic solvent or oil to cast molding or calender molding, and then removing the solvent or oil.

Film lamination methods include a co-extrusion method, an extrusion lamination method, a coating method, and the like. These methods can also be combined. In the co-extrusion method, resin compositions for layers melt-kneaded in separate extruders are laminated in a feed block or multi-manifold and extruded, and film formation and lamination are performed in parallel. In the extrusion lamination method, a resin composition is extruded onto a film formed in advance to laminate films. In the coating method, films are formed and laminated by coating a resin solution, emulsion, or dispersion on films, followed by drying.

Among these methods, the co-extrusion method is preferred from the viewpoint that each layer can be firmly attached.

«Stretching»

The substrate layer or the heat sealing layer may be an unstretched film or a stretched film.

Examples of the stretching method include a longitudinal stretching method utilizing the difference in circumferential speed between a plurality of rolls, a transverse stretching method using a tenter oven, a sequential biaxial stretching method combining these methods, a rolling method, a simultaneous biaxial stretching method combining a tenter oven and a pantograph, a simultaneous biaxial stretching method combining a tenter oven and a linear motor, and the like. Other usable methods include a simultaneous biaxial stretching (inflation molding) method in which a circular die connected to a screw-type extruder is used to extrude a molten resin into a tubular shape, and then air is blown thereinto.

The substrate layer and the heat sealing layer may be stretched individually before lamination of each layer, or may be stretched together after lamination. Alternatively, the stretched layers may be stretched again after lamination.

When the thermoplastic resin used for each layer is an amorphous resin, the stretching temperature during stretching is preferably in a range equal to or more than the glass transition point of the thermoplastic resin. When the thermoplastic resin is a crystalline resin, the stretching temperature is preferably in a range equal to or more than the glass transition point of the amorphous portion of the thermoplastic resin and equal to or less than the melting point of the crystalline portion of the thermoplastic resin.

The stretching speed is not particularly limited, but is preferably within the range of 20 to 350 m/min from the viewpoint of stable stretching.

The stretch ratio can be determined as appropriate, taking into consideration the characteristics of the resin and the like. For example, when a film containing a homopolymer of propylene or a copolymer thereof is stretched in one direction, the stretch ratio is generally about 1.2 times or more, and preferably 2 times or more, while it is generally 12 times or less, and preferably 10 times or less. The stretch ratio in the case of biaxial stretching is such that the area stretch ratio is generally 1.5 times or more, and preferably 10 times or more, while it is generally 60 times or less, and preferably 50 times or less.

When the stretch ratio is within the above range, the desired porosity can be obtained, and the opacity is easily improved. In addition, film breakage is less likely to occur, and stable stretching tends to be possible.

«Printing»

A printed layer can be provided by printing on the surface of the substrate layer of the label on the side opposite to the heat sealing layer. Examples of print information include product display such as product name and logo, manufacturer, distributor name, method of use, barcode, and the like.

Examples of the printing method include gravure printing, offset printing, flexographic printing, seal printing, screen printing, and the like.

The printed layer is not limited to printing by the above printing methods, and may include conventionally known decorations, such as printing by various printers, foil stamping such as hot stamping and cold stamping, transfer foil, and holograms.

«Label Processing»

The label of the present invention can be processed to the required shape and size by cutting or punching. Cutting or punching can be carried out before printing, but is preferably carried out after printing for the ease of work.

From the viewpoint of suppressing wrinkles and the like on the label, the thickness of the label is preferably 40 μm or more, and more preferably 60 μm or more. Further, from the viewpoint of suppressing strength reduction due to thinning of the part of the container in which the label is embedded, the thickness of the label is preferably 150 μm or less, and more preferably 120 μM or less. Therefore, the thickness of the label is preferably 40 to 200 μm, and more preferably 60 to 150 μm.

[Method for Producing Labeled Container]

The labeled container of the present invention can be produced by subjecting a resin container to in-mold molding using a mold with a label on the inner wall.

(In-Mold Molding)

The production of the labeled container of the present invention is performed by stretch blow molding. This makes it easier to adjust the size of the notch portion of the resin container. The stretch blow method is a method in which a preform formed from a raw material resin in advance is heated to near the softening point of the raw material resin, and the preform is stretched with a rod in a mold and expanded by applying air pressure to form a container.

From the viewpoint of embedding the label in the resin container and increasing the depth (d) and width (L) of the notch portion, the blow pressure in the stretch blow method is preferably 2 MPa or more, and more preferably 2.5 MPa or more. The temperature of the polyester-based resin in the stretch blow method is preferably 105° C. or more, and more preferably 110° C. or more.

On the other hand, from the viewpoint of reducing the lengths (d) and (L) of the notch portion, the blow pressure in the stretch blow method is preferably 4 MPa or less, and more preferably 3.5 MPa or less. The temperature of the polyester-based resin in the stretch blow method is preferably 130° C. or less, and more preferably 120° C. or less.

EXAMPLES

The present invention will be described in more detail below with reference to Examples; however, the present invention is not limited to the following Examples. In the Examples, the terms such as "parts" and "%" are on a mass basis unless otherwise specified.

[Raw Materials]

Table 1 shows a list of the raw materials used in the production of labels in the Examples and Comparative Examples.

TABLE 1

| | Material | Symbol | Content |
|---|---|---|---|
| Substrate layer | Polyolefin-based resin | PP1 | Polypropylene resin (product name: Novatec PP MA3U, produced by Japan Polypropylene Corporation, MFR (230° C., 2.16 kg load): 15 g/10 min) |
| | | PP2 | Polypropylene resin (product name: Novatec PP MA4, produced by Japan Polypropylene Corporation, MFR (230° C., 2.16 kg load): 5 g/10 min, melting point: 167° C.) |
| | Inorganic filler | F1 | Heavy calcium carbonate particles (product name: Softon 1800, produced by Bihoku Funka Kogyo Co., Ltd., average particle size: 1.8 μm) |
| | | F2 | Rutile-type titanium dioxide fine powder (produced by Ishihara Sangyo Kaisha, Ltd., product name: Tipaque CR-60, volume average particle size: 0.2 μm) |
| Heat sealing layer | Polyolefin-based resin | PE1 | Metallocene-based polyethylene (produced by Japan Polypropylene Corporation, product name: Kernel KS240T, MFR (190° C., 2.16 kg load): 2.2 g/10 min, melting point: 60° C.) |
| | | PE2 | Metallocene-based polyethylene (produced by Japan Polyethylene Corporation, product name: Kernel KS571, MFR (190° C., 2.16 kg load): 12 g/10 min, melting point: 100° C.) |
| | | PE3 | Linear polyethylene (produced by Japan Polyethylene Corporation, product name: Novatec LL-UF524, MFR (190° C., 2.16 kg load): 0.9 g/10 min, melting point: 123° C.) |
| | Other resins | EVA | Ethylene-vinyl acetate copolymer (produced by Japan Polyethylene Corporation, Novatec LV440, MFR (230° C., 2.16 kg load): 2 g/10 min, melting point: 89° C.) |
| | | EMMA | Ethylene-methyl methacrylate-based copolymer (produced by Sumitomo Chemical Co., Ltd., product name: Acryft WH206-F, MMA content: 20 wt %, MFR (230° C., 2.16 kg load): 2 g/10 min, melting point: 86° C.) |

[Production of Labels]

Production Example 1 of Label 100 mass % of polypropylene for forming a substrate layer (produced by Japan Polypropylene Corporation, product name: MA3U, MFR (230° C., 2.16 kg load): 15 g/10 min) and 100 mass % of metallocene-based polyethylene for forming a heat sealing layer (produced by Japan Polypropylene Corporation, product name: Kernel KS240T, MFR (190° C., 2.16 kg load): 2.2 g/10 min, melting point: 60° C.) were melt-kneaded at 240° C. using separate extruders.

The melt-kneaded resins were supplied to one co-extrusion T-die, laminated in two layers in the T-die, and extruded into a sheet shape from the T-die at 240° C. As a result, a two-layer sheet in which a substrate layer made of polypropylene and a heat sealing layer made of metallocene-based polyethylene were laminated was obtained. The two-layer sheet was guided between a semi-mirror chill roll and a matte rubber roll, and cooled under clamping pressure (linear pressure of about 1.5 kg/cm). After cutting off the edges, the sheet was wound by a winder to obtain a polyolefin resin film with a thickness of 90 μm. The obtained film was punched into a rectangle of 8 cm×6 cm to produce a label of Production Example 1. The total layer thickness of the label of Production Example 1 was 90 μm. The thickness of the substrate layer was 87 μm, and the thickness of the heat sealing layer was 3 μm.

Production Example 2 of Label 84 mass % of a propylene homopolymer (produced by Japan Polypropylene Corporation, product name: Novatec PP MA4, MFR (230° C., 2.16 kg load): 5 g/10 min, melting point: 167° C.), 15 mass % of heavy calcium carbonate fine powder (produced by Bihoku Funka Kogyo Co., Ltd., product name: Softon #1800, volume average particle size: 1.8 μm), and 1 mass % of rutile-type titanium dioxide fine powder (produced by Ishihara Sangyo Kaisha, Ltd., product name: Tipaque CR-60, volume average particle size: 0.2 μm) were mixed with a mixer. Then, the mixture was melt-kneaded at 230° C. using an extruder to prepare a resin composition for the substrate layer.

On the other hand, 100 mass % of polyethylene (produced by Japan Polyethylene Corporation, product name: Kernel KS571, MFR (190° C., 2.16 kg load): 12 g/10 min, melting point: 100° C.) was melted in an extruder heated to 210° C. to prepare a resin composition for the heat sealing layer.

The resin compositions for the substrate layer and heat sealing layer were supplied to a two-layer co-extrusion T-die, laminated in the die, and extruded into a sheet shape to form a two-layer sheet. The two-layer sheet was cooled by a cooling device to obtain an unstretched sheet with a two-layer structure. The obtained unstretched sheet was heated to 150° C. and stretched 5 times in the longitudinal direction by utilizing the difference in circumferential speed between a plurality of rolls. After cooling to a temperature of 60° C., the sheet was heated again to a temperature of 150° C. and stretched 8 times in the transverse direction using a tenter. After annealing at a temperature of 160° C., the sheet was cooled down to a temperature of 60° C. to obtain a white opaque biaxially stretched polyolefin resin film with a two-layer structure.

Next, after slitting the edges of the biaxially stretched polyolefin resin film, the film was wound in a roll shape by a winder. The film was punched into a rectangle of 8 cm×6 cm to produce a label of Production Example 2. The total layer thickness of the label of Production Example 2 was 95 μm, and the density was 0.76 g/cm$^3$. The thickness of the substrate layer was 92 μm, and the thickness of the heat sealing layer was 3 μm.

Production Example 3 of Label

A resin composition for the substrate layer was prepared in the same manner as in Production Example 2 of Label.

Further, an ethylene-methyl methacrylate-based copolymer (produced by Sumitomo Chemical Co., Ltd., product name: Acryft WH206-F, MMA content: 20 wt %, MFR (230° C., 2.16 kg load): 2 g/10 min, melting point: 86° C.) and a tackifier (produced by Harima Chemicals Group, Inc., product name: Haritack SE10, stabilized rosin ester, softening point: 78-87° C., acid value: 2-10 gKOH) were mixed at a weight ratio of 7:3 and melted in an extruder heated to 150° C. to prepare a resin composition for the heat sealing layer.

The resin compositions for the substrate layer and heat sealing layer were supplied to a two-layer co-extrusion T-die, and a white opaque biaxially stretched polyolefin resin film with a two-layer structure was obtained in the same manner as in Production Example 2 of Label.

Next, after slitting the edges of the biaxially stretched polyolefin resin film, the film was wound in a roll shape by a winder. The film was punched into a rectangle of 8 cm×6 cm to produce a label of Production Example 3. The total layer thickness of the label of Production Example 3 was 95 μm, and the density was 0.77 g/cm$^3$. The thickness of the substrate layer was 93 μm, and the thickness of the heat sealing layer was 2 μm.

Production Example 4 of Label

A label of Production Example 4 was produced in the same manner as in Production Example 2, except that in Production Example 2, the material of the heat sealing layer was changed to a mixture of 80 wt % of linear polyethylene (produced by Japan Polyethylene Corporation, product name: Novatec LL-UF524, MFR (190° C., 2.16 kg load): 0.9 g/10 min, melting point: 123° C.) and 20 wt % of an ethylene-vinyl acetate copolymer (EVA) (produced by Japan Polyethylene Corporation, Novatec LV440, MFR (230° C., 2.16 kg load): 2 g/10 min, melting point: 89° C.)

Production Example 5 of Label

Resin compositions for the substrate layer and heat sealing layer were prepared in the same manner as in Production Example 1. The resin compositions for the substrate layer and heat sealing layer were supplied to a two-layer co-extrusion T-die, laminated in the die, and extruded into a sheet shape to form a two-layer sheet. The two-layer sheet was cooled by a cooling device to obtain an unstretched sheet with a two-layer structure. The obtained unstretched sheet was heated to 150° C. and stretched 5 times in the longitudinal direction by utilizing the difference in circumferential speed between a plurality of rolls. After cooling to a temperature of 60° C., the sheet was heated again to a temperature of 150° C. and stretched 8 times in the transverse direction using a tenter. After annealing at a temperature of 160° C., the sheet was cooled down to a temperature of 60° C. to obtain a biaxially stretched polyolefin resin film with a two-layer structure.

Next, after slitting the edges of the biaxially stretched polyolefin resin film, the film was wound in a roll shape by a winder. The film was punched into a rectangle of 8 cm×6 cm to produce a label of Production Example 5. The total layer thickness of the label of Production Example 5 was 90 μm, the thickness of the substrate layer was 87 μm, and the thickness of the heat sealing layer was 3 μm.

Production Example 6 of Label

The material of the substrate layer was prepared in the same manner as in Production Example 1, and the material of the heat sealing layer was prepared in the same manner as in Production Example 4. The resin compositions for the substrate layer and heat sealing layer were supplied to a two-layer co-extrusion T-die, laminated in the die, and extruded into a sheet shape to form a two-layer sheet. The two-layer sheet was cooled by a cooling device to obtain an unstretched sheet with a two-layer structure. The obtained unstretched sheet was heated to 150° C. and stretched 5 times in the longitudinal direction by utilizing the difference in circumferential speed between a plurality of rolls. After cooling to a temperature of 60° C., the sheet was heated again to a temperature of 150° C. and stretched 8 times in the transverse direction using a tenter. After annealing at a temperature of 160° C., the sheet was cooled down to a temperature of 60° C. to obtain a biaxially stretched polyolefin resin film with a two-layer structure.

Next, after slitting the edges of the biaxially stretched polyolefin resin film, the film was wound in a roll shape by a winder. The film was punched into a rectangle of 8 cm×6 cm to produce a label of Production Example 6. The total layer thickness of the label of Production Example 6 was 90 μm, the thickness of the substrate layer was 87 μm, and the thickness of the heat sealing layer was 3 μm.

Production Example 7 of Label

The material of the substrate layer was prepared in the same manner as in Production Example 2, and the resin composition for the heat sealing layer was prepared in the same manner as in Production Example 1. The resin compositions for the substrate layer and heat sealing layer were supplied to a two-layer co-extrusion T-die, laminated in the die, and extruded into a sheet shape to form a two-layer sheet. The two-layer sheet was cooled by a cooling device to obtain an unstretched sheet with a two-layer structure. The obtained unstretched sheet was heated to 150° C. and stretched 5 times in the longitudinal direction by utilizing the difference in circumferential speed between a plurality of rolls. After cooling to a temperature of 60° C., the sheet was heated again to a temperature of 150° C. and stretched 8 times in the transverse direction using a tenter. After annealing at a temperature of 160° C., the sheet was cooled down to a temperature of 60° C. to obtain a white opaque biaxially stretched polyolefin resin film with a two-layer structure.

Next, after slitting the edges of the biaxially stretched polyolefin resin film, the film was wound in a roll shape by a winder. The film was punched into a rectangle of 8 cm×6 cm to produce a label of Production Example 7. The total layer thickness of the label of Production Example 7 was 90 μm, the thickness of the substrate layer was 87 μm, and the thickness of the heat sealing layer was 3 μm.

Production Example 8 of Label

A label was produced in the same manner as in Production Example 1, except that the thickness of the heat sealing layer was changed. The total layer thickness of the label of Production Example 1 was 90 μm. The thickness of the substrate layer was 75 μm, and the thickness of the heat sealing layer was 15 μm.

[Production of Labeled Container]

Example 1

The label of Production Example 1 was charged using an electrostatic charging device, then fixed inside a molding mold of a stretch blow molding machine (produced by Nissei ASB Machine Co., Ltd., machine name: ASB-70DPH), and clamped. At this time, the label was sucked and fixed so that the substrate layer thereof was in contact with the cavity of the mold. The temperature of the mold was controlled with circulating water so that the surface temperature of the mold on the cavity side was 45° C.

On the other hand, a preform made of polyethylene terephthalate (PET) resin (produced by Japan Unipet Co., Ltd., product name: Unipet RD383, melting point: 235° C.) was preheated to 110° C. Next, the preform was guided to a mold and subjected to stretch blow molding while applying a blow pressure of 3 MPa for 1 second. After cooling to 50° C. for 15 seconds, the mold was opened, thereby obtaining a labeled container.

Examples 2 to 5

Labeled containers were obtained in the same manner as in Example 1, except that the labels of Production Examples 5 to 8 were used.

Comparative Example 1

A labeled container of Comparative Example 1 was produced in the same manner as in Example 1, except that in Example 1, the label of Production Example 1 was changed to the label of Production Example 3.

Comparative Example 2

The label of Production Example 4 was sucked and fixed so that the surface layer side was in contact with one of the split molds for direct blow molding. Next, polyethylene terephthalate (produced by Japan Unipet Co., Ltd., product name: Unipet RD383, melting point: 235° C.) was melt-extruded at 260° C. to form a parison. After the parison was introduced between the split molds, the split molds were clamped, and air with a pressure of 0.5 MPa was supplied into the parison to obtain a labeled container of Comparative Example 2. At this time, the temperature of the mold was controlled with circulating water so that the surface temperature of the mold on the cavity side was 15° C.

Comparative Example 3

A labeled container of Comparative Example 3 was obtained in the same manner as in Comparative Example 2, except that in Comparative Example 2, in place of the polyethylene terephthalate (PET) resin, high-density polyethylene (HDPE) (product name: Novatec HDHB330, produced by Japan Polyethylene Corporation, melting point: 133° C.) was melt-extruded at 220° C. to form a parison, the blow pressure was changed to 0.4 MPa, the surface temperature of the mold on the cavity side was changed to 10° C., and the label of Production Example 2 was used in place of the label of Production Example 4.

[Evaluation Methods]

<Measurement of Size of Notch Portion of Resin Container>

The labeled containers of the Examples and Comparative Examples were each cut from above the label with a utility knife, and two samples for observation were produced from one labeled container. At this time, a region including one side near the mouth of the container was cut away to select a region that was less affected by stretching during production of the labeled container.

«Measurement of Depth (d)»

The produced sample was observed with an optical microscope, and the notch portion around the label was searched. In the observed image, as shown in FIG. 2, an intersection P1 between an inclined surface K1 of the resin container 1 forming the notch portion 11 and the end surface of the label 2 was identified. Further, an intersection P2 between a line K3 including the intersection P1 and extending in the thickness direction of the label 2, and a line K4 extending along the surface of the resin container 1 to which the label was not attached was identified. Then, the distance between the intersection P1 and the intersection P2 was measured. The measurements were performed twice at different observation positions, and the average of the measured values was taken as the measured value [μm] of the depth d of the notch portion.

«Measurement of Width (L)»

Next, in the observed image, as shown in FIG. 2, an intersection P3 between the line K4 and the inclined surface K1 was identified. Then, the distance between the intersection P2 and the intersection P3 was measured. The measurements were performed twice at different observation positions, and the average of the measured values was taken as the measured value [μm] of the width L of the notch portion.

<Embedding Rate>

From the thickness t (μm) of each label (when the label protrudes from the surface of the resin container, the thickness of the label excluding the protruding part) and the measured depth d (μm) of the notch portion, the embedding rate (%) of the label was determined by the above formula (F1).

<Trigger for Peeling>

The surface of the resin container of the labeled container was scratched with a nail from around the label toward the label. The trigger for label peeling at this time was evaluated as follows.

Excellent: The nail was very easily caught in the notch portion between the resin container and the label.

Good: The nail was easily caught in the notch portion between the resin container and the label.

Fair: The nail was caught in the notch portion between the resin container and the label.

Poor: The nail was not caught.

<Ease of Peeling>

The ease of peeling of the label from the labeled container was evaluated as follows.

A nail was placed at one of the ends of the labeled container with a label to cause a peeling of 10 mm or less in length. The peeled portion was connected to a digital force gauge (DST-20N, produced by Imada Co., Ltd.), and peel force was applied to the peeled portion to peel off the label.

The peel force required to peel off the entire label was used to evaluate the ease of peeling of the label as follows. If the peel force exceeds 10 kN, peeling by hand is difficult.

Excellent: a peel force of 4 kN or less

Good: a peel force of 4 kN or more and 10 kN or less

Poor: a peel force of more than 10 kN

<Adhesiveness>

The label portion of the labeled container was grabbed by hand and squeezed (deformed) 10 times. After that, the lifting and removal of the label were observed, and the adhesiveness of the label in the labeled container was evaluated as follows.

Excellent: No lifting or removal of the label was observed after 10 squeezes; sufficient adhesiveness for practical use Good: Although no lifting or removal of the label was observed after 5 squeezes, lifting and removal of the label were observed after 10 squeezes; adhesiveness for practical use Poor: Lifting and removal of the label were observed after 5 squeezes; impractical adhesiveness Table 2 below shows the evaluation results. In the molding methods of Table 2, ISBM (injection stretch blow molding) indicates a stretch blow method. EBM (extrusion blow molding) indicates a direct blow method.

TABLE 2

| | Label | | Container | | | | Labeled container | |
|---|---|---|---|---|---|---|---|---|
| | | Resin material of attached surface | Resin material of attached surface | Blow molding conditions | | | Label thickness [μm] | |
| | | | | Molding method | Molding temperature [° C.] | Blow pressure [Mpa] | Entire thickness (t) | Heat sealing layer |
| Example 1 | Production Example 1 | PE1 | PET | ISBM | 110 | 3.0 | 90 | 3 |
| Example 2 | Production Example 5 | PE1 | PET | ISBM | 110 | 3.0 | 90 | 3 |
| Example 3 | Production Example 6 | EVA, PE3 | PET | ISBM | 110 | 3.0 | 90 | 2 |
| Example 4 | Production Example 7 | PE1 | PET | ISBM | 110 | 3.0 | 90 | 3 |
| Example 5 | Production Example 8 | PE1 | PET | ISBM | 110 | 3.0 | 90 | 15 |
| Comparative Example 1 | Production Example 3 | EMMA | PET | ISBM | 110 | 3.0 | 95 | 2 |
| Comparative Example 2 | Production Example 4 | EVA, PE3 | PET | EBM | 260 | 0.5 | 95 | 3 |
| Comparative Example 3 | Production Example 2 | PE2 | PE (HDPE) | EBM | 220 | 0.4 | 95 | 3 |

| | Labeled container | | | | | |
|---|---|---|---|---|---|---|
| | | Notch portion | | Evaluation | | |
| | Embedding rate [%] | Depth d [μm] | Width L [μm] | Trigger for peeling | Ease of peeling | Adhesiveness |
| Example 1 | 22.2 | 70 | 645 | Good | Good | Excellent |
| Example 2 | 11.1 | 80 | 440 | Good | Excellent | Fair |
| Example 3 | 11.1 | 80 | 340 | Fair | Fair | Excellent |
| Example 4 | 5.6 | 85 | 559 | Good | Good | Good |
| Example 5 | 28.9 | 64 | 849 | Excellent | Excellent | Excellent |

TABLE 2-continued

| | | | | | | |
|---|---|---|---|---|---|---|
| Comparative Example 1 | 4.2 | 91 | 536 | Good | Poor | Excellent |
| Comparative Example 2 | 98.9 | 1 | 261 | Poor | Good | Excellent |
| Comparative Example 3 | 89.5 | 10 | 246 | Poor | Poor | Excellent |

As shown in Table 2, Example 1, which has a notch portion of a predetermined size, easily creates a trigger for peeling and has adhesiveness for practical use. In Example 1, the notch portion has a predetermined size, and the main component resin of the heat sealing layer and the resin container is a combination of a polyethylene resin and a polyester resin; thus, the ease of peeling is also good.

In contrast, as for Comparative Examples 1 and 3, a resin having a polar group or the same type of resin is used in part of the heat sealing layer as in the resin container; thus, the adhesiveness is high, but too high, making it difficult to peel off the label. Comparative Examples 2 and 3, in which the notch portions of the resin containers are less than the predetermined size, are difficult to create a trigger for peeling.

The present application claims priority based on Japanese Patent Application No. 2021-38366, filed on Mar. 10, 2021, the entire content of which is incorporated herein by reference.

REFERENCE SIGNS LIST

10 . . . labeled container, 1 . . . resin container, 11 . . . notch portion, 2 . . . label, 2*a* . . . tab portion, 21 . . . substrate layer, 22 . . . heat sealing layer

The invention claimed is:

1. A labeled container, comprising a label having a heat sealing layer, and a resin container to which the label is attached through the heat sealing layer, wherein a part of the label is embedded in the resin container, a notch portion is provided around the label, the notch portion has a depth (d) of 40 μm or more, the notch portion has a width (L) of 300 μm or more, wherein, in a thickness direction of the container, the part of the label that is embedded in the resin container extends past the depth of the notch portion and is configured to peel from the container at a surface positioned lower than the depth of the notch portion, and one selected from the resin container and the heat sealing layer on the attached surfaces contains a polyolefin resin as a main component, and the other contains a polyester resin as a main component.

2. The labeled container according to claim 1, wherein the notch portion has a depth (d) of 100 μm or less.

3. The labeled container according to claim 1, wherein the notch portion has a width (L) of 900 μm or less.

4. The labeled container according to claim 1, wherein the heat sealing layer contains a polyolefin resin as a main component, and the resin container contains a polyester resin as a main component.

5. The labeled container according to claim 1, wherein the label comprises a substrate layer on a surface of the heat sealing layer on a side opposite to the resin container, and the substrate layer is a porous resin film comprising a thermoplastic resin and a filler.

6. The labeled container according to claim 1, wherein an embedding rate of the label in the resin container calculated by the following formula (F1) is 3% or more and 50% or less:

$$\text{Embedding rate } (\%) = (t-d) \times 100/t \qquad \text{(F1)}$$

in the formula (F1), t represents the thickness of the label, and d represents the depth of the notch portion.

7. The labeled container according to claim 1, wherein the resin container contains polyolefin resin as the main component, and the polyolefin resin includes polypropylene-based resin or polyethylene-based resin.

8. The labeled container according to claim 1, wherein the heat sealing layer contains polyolefin resin as a main component, and the polyolefin resin includes at least one resin selected from the group consisting of ethylene-based resins, propylene-based resins, ethylene-propylene copolymers, and ethylene-α-olefin copolymers.

9. The labeled container according to claim 1, wherein the heat sealing layer further contains a resin having an olefin and a monomer having a polar group other than olefins as polymer components.

* * * * *